United States Patent [19]

Vollbrecht et al.

[11] Patent Number: 4,511,508

[45] Date of Patent: Apr. 16, 1985

[54] PROCESS FOR DRYING OF NATURAL EXTRACTS PREPARED BY HIGH PRESSURE EXTRACTION

[75] Inventors: Heinz-Rüdiger Vollbrecht, Stein; Erwin Schütz, Palling; Klaus Sandner, Trostberg, all of Fed. Rep. of Germany

[73] Assignee: SKW Trostberg AG, Trostberg, Fed. Rep. of Germany

[21] Appl. No.: 372,414

[22] Filed: Apr. 27, 1982

[30] Foreign Application Priority Data

May 7, 1981 [DE] Fed. Rep. of Germany ....... 3118160

[51] Int. Cl.$^3$ .............................................. C07G 17/00
[52] U.S. Cl. ................................... 426/665; 426/425; 426/600; 426/655
[58] Field of Search ...................................... 260/236.5

[56] References Cited

FOREIGN PATENT DOCUMENTS

| 2107201 | 9/1971 | Fed. Rep. of Germany . |
| 2905078 | 8/1979 | Fed. Rep. of Germany . |
| 2827802 | 1/1980 | Fed. Rep. of Germany . |
| 2844781 | 4/1980 | Fed. Rep. of Germany . |

OTHER PUBLICATIONS

Chem. Abst. 93: 74863a, 1980.
Chem. Abst. 76: 12985g, 1972.

*Primary Examiner*—Leonard Schenkman
*Assistant Examiner*—John W. Rollins
*Attorney, Agent, or Firm*—Felfe & Lynch

[57] ABSTRACT

A method is described for drying extracts of natural substances obtained by high-pressure extraction with liquefied gases or gases in the supercritical state; it consists in treating the gas stream that is charged with the extract with a solid drying agent, preferably calcium sulfate, in powder or granular form.

8 Claims, No Drawings

PROCESS FOR DRYING OF NATURAL EXTRACTS PREPARED BY HIGH PRESSURE EXTRACTION

BACKGROUND

The invention relates to a process for the drying of natural substance extracts obtained by high-pressure extraction with liquefied gases or gases in the supercritical state.

It is known that a lower moisture content in extracts of natural substances results in an improvement in their stability in storage and in such practical properties as solubility and proportionability (German OS No. 2,627,534).

In the known extraction processes (solid-to-liquid or liquid-to-liquid) an attempt has been made to keep the moisture content low by using an extracting agent which does not mix with water, such as a hydrocarbon, for example. This method, however, is applicable only to natural substances in the pre-dried state. This method of extraction cannot be applied to plants or plant parts of high moisture content, since there is no assurance that the vegetable materials will be wetted by the organic extractant which is not miscible with water, and thus that all of the substances they contain will be extracted.

On the other hand, to reduce the moisture content of the extracted natural substances, extractants which are miscible with water are also used, such as alcohols for example. As a result, however, the solutions of the natural substance extracts thus prepared have to be heated to such an extent as to evaporate both the solvent and the water. This method, however, has considerable disadvantages on account of the great thermal stress on the natural substance extracts and the evaporation of a number of desirable components. Furthermore, an additional procedure is required in order to separate the solvent-and-water mixture.

In recent times a number of methods have become known in which the extraction of natural substances is performed with liquefied gases or with gases in the supercritical state (DE-OS No. 21 07 201, DE-PS No. 21 27 618, DE-PS No. 21 42 205, DE-AS No. 28 27 002, DE-AS No. 28 44 781 and DE-OS No. 29 05 078). The advantages of this extraction technique are the physiological acceptability of the extractant—carbon dioxide being used mostly for the purpose—as well as the extremely gentle treatment both of the extract and of the material being extracted, and the completeness of the extraction, since even the volatile components, especially the flavor substances, remain in the extract.

In this procedure the relatively high moisture content of the natural substance extracts has proven disadvantageous, especially in the extraction of fresh plants or plant parts. It has therefore been necessary heretofore to perform a complex after-treatment of the extracts if one is unwilling to forego one decided advantage of these methods, namely the low heat to which the extracts are subjected.

The object of the present invention consists in devising a method whereby it will be possible to dry in a simple and gentle manner the natural substance extracts obtained by high-pressure extraction with liquefied gases or gases in the supercritical state, without incurring losses of desired components, namely volatile components such as flavor substances.

THE INVENTION

This object is achieved by the distinctive features of the method specified in the principal claim. The subordinate claims relate to especially preferred embodiments of the invention.

The process of the invention, of the kind described in the beginning, is characterized by the fact that the gas stream charged with the extract is treated with a solid drying agent in powder or granular form. The treatment can be performed by passing this gas stream over and/or through a layer of the drying agent, which preferably is of such a particle size that the gas flow is not impaired and although the drying effect is great the gas does not entrain any fine particles of the drying agent.

Silica gel, magnesium oxide, aluminum oxide, bleaching earth and especially calcium sulfate can be used as the drying agent. Surprisingly it has been found that, when calcium sulfate is used as the drying agent, virtually no adsorption of any components of the natural substance extract is encountered, and only water is absorbed. Thus not only are losses of important components prevented, which might under certain circumstances cause an undesirable alteration of flavor if important flavor substances are eliminated, but also an easy regeneration of the water-saturated calcium sulfate is made possible, since the surface of this drying agent, which is the one preferred according to the invention, does not become coated with extracts eventually to become ineffective. Furthermore, the exhaust air from the dryers can be vented to the atmosphere without purification because it has absorbed no foreign substances except water.

The procedure of the invention represents a substantial simplification of the manufacture of natural extracts with a low water content, since high-pressure extractions with liquefied gases or with gases in the supercritical state can be performed not only with pre-dried natural substances, but also with fresh plants or plant parts of relatively high moisture content, without expensive aftertreatment.

In the method of the invention, the plant parts that are to be extracted, such as for example hop pellets or fresh, ground hops, camomile, dill, parsley, tarragon and the like, are extracted with preferably carbon dioxide at supercritical pressure, after which the gas charged with the extracted substances is passed through the drying agent, preferably calcium sulfate. The preferably used calcium sulfate is capable of absorbing up to 6% of its weight of water. Then follows a reduction of pressure and the separation of the extract. As soon as the calcium sulfate is saturated with water, it is regenerated back to its initial weight with hot air at a temperature of 100° to 300° C., preferably about 170° C., and can be used again as drying agent in the process of the invention. The exhaust air emerging from the dryers does not require any further treatment prior to its emission into the atmosphere.

According to a preferred embodiment of the invention, the drying is accomplished by means of two dryers disposed in the gas stream, which operate alternately, the one dryer serving for drying while the drying agent is regenerated in the other dryer, preferably by treatment with hot air of a temperature of 100° to 300° C., and preferably of about 170° C.

EXAMPLES

The following examples will serve for the further explanation of the invention.

EXAMPLE 1 (For purposes of comparison)

700 g of hop pellets with a moisture content of 8.1% is extracted for 6 hours with carbon dioxide at 160 bar and 31° C. After separation of the extract at 43 bar and 22° C., 135.0 g of an extract with a moisture content of 20.6% is obtained.

EXAMPLE 2

550 g of hop pellets with a moisture content of 9.7% is extracted for 6 hours with carbon dioxide at 160 bar and 31° C. The gas charged with the extracted substances is passed through a mass of 800 g of calcium sulfate, and then the extract is separated at 44 bar and 22° C. 90.0 g is obtained of an extract having a moisture content of only 5.6%.

EXAMPLE 3 (For purposes of comparison)

350 g of fresh, ground hops with a moisture content of 78% is extracted with carbon dioxide at 160 bar and 31° C. for two hours. After separation of the extract at 45 bar and 25° C., 19.4 g of an extract is obtained having a moisture content of 32.0%.

EXAMPLE 4

250 g of fresh, ground hops with a moisture content of 78% is extracted for two hours with carbon dioxide at 160 bar and 31° C. The gas laden with the extracts is passed through a mass of 800 g of calcium sulfate, after which the extract is separated at 40 bar and 21° C. 9.6 g of an extract having a moisture content of only 6.2% is obtained.

EXAMPLE 5 (For purposes of comparison)

500 g of fresh camomile blossoms is extracted for two hours with carbon dioxide at 160 bar and 31° C. 5.9 g of an extract is obtained having a moisture content of 74%.

EXAMPLE 6

400 g of fresh camomile blossoms are extracted for two hours with carbon dioxide at 160 bar and 31° C. The gas charged with the extracted substances is passed through a calcium sulfate mass. 1.7 g of an extract having a moisture content of only 7% is obtained.

We claim:

1. A process for drying extracts of plant or plant part origin obtained by high-pressure extraction with liquefied gases or gases in the supercritical state whereafter the extract is recovered from the gas stream, wherein the improvement comprises the step of removing moisture from the gas stream laden with the extract, before recovering the extract.

2. A process for drying extracts of plant or plant part origin obtained by high-pressure extraction with liquefied gases or gases in the supercritical state whereafter the extract is recovered from the gas stream, wherein the improvement comprises the step of removing moisture from the gas stream laden with the extract, before recovering the extract, by passing the gas stream laden with the extract over and/or through a solid drying agent in powder or granular form.

3. The process of claim 2 wherein the drying agent is silica gel, magnesium oxide, aluminum oxide, bleaching earth or calcium sulfate.

4. The process of claim 3 wherein the liquified gas comprises carbon dioxide.

5. The process of claim 3, wherein calcium sulfate is used as the drying agent.

6. The process of claim 5, further comprising the steps of regenerating the calcium sulfate containing moisture, by treatment with hot air at a temperature of 100° to 300° C.

7. The process of claim 6 wherein the temperature used is about 170° C.

8. The process of claim 2 or 3 wherein there are provided two separate dryers containing the drying agent for treating the gas stream, further comprising the steps of passing the gas stream through a first one of the two dryers while simultaneously subjecting the drying agent in the second one of said dryers to treatment with hot air at a temperature of 100° C. to 300° C. to regenerate the drying agent therein, and thereafter, passing the gas stream through the second dryer while simultaneously regenerating the drying agent in the first dryer.

* * * * *